No. 712,371. Patented Oct. 28, 1902.
V. T. GILCHRIST.
COMBINED STOP AND RELEASE MECHANISM FOR PLOWS.
(Application filed July 30, 1902.)
(No Model.)
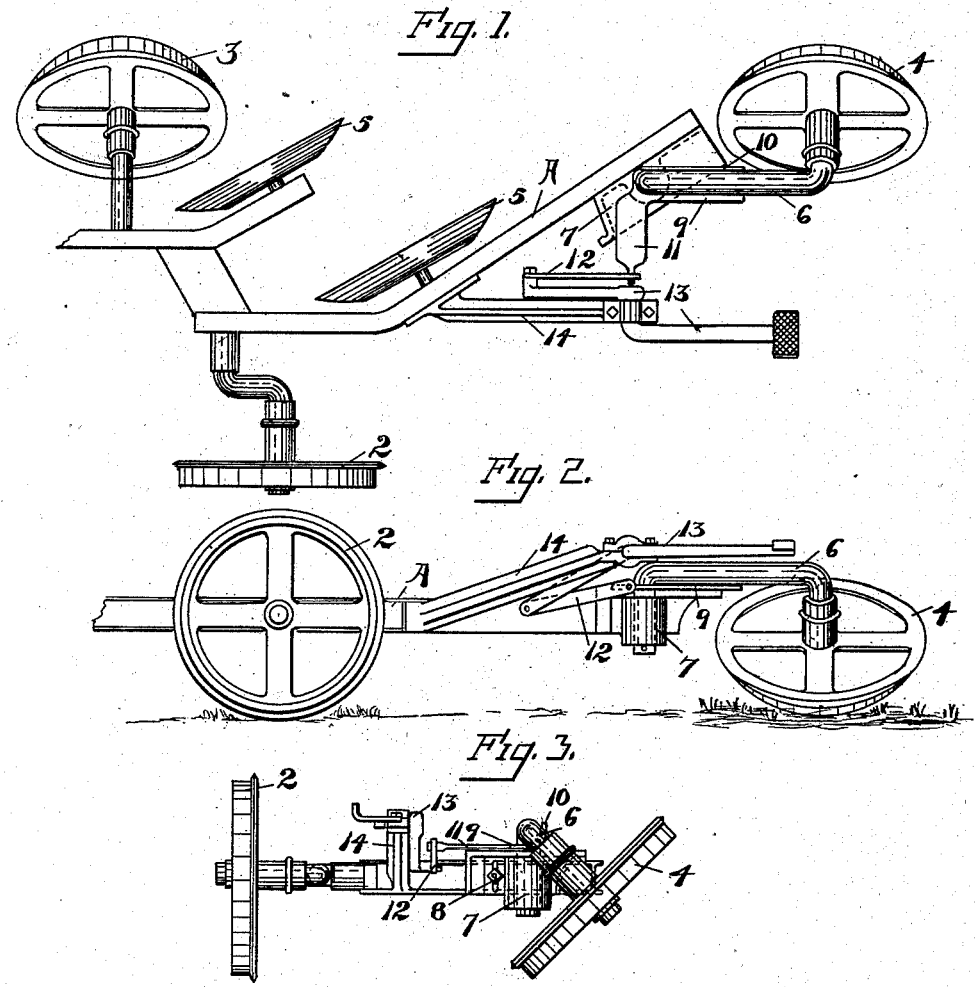

UNITED STATES PATENT OFFICE.

VINCENT T. GILCHRIST, OF BENICIA, CALIFORNIA, ASSIGNOR TO BAKER & HAMILTON, OF SAN FRANCISCO, CALIFORNIA, A CORPORATION OF CALIFORNIA.

COMPOUND STOP AND RELEASE MECHANISM FOR PLOWS.

SPECIFICATION forming part of Letters Patent No. 712,371, dated October 28, 1902.

Application filed July 30, 1902. Serial No. 117,638. (No model.)

*To all whom it may concern:*

Be it known that I, VINCENT T. GILCHRIST, a citizen of the United States, residing at Benicia, county of Solano, State of California, have invented an Improvement in a Combined Stop and Release Mechanism for Rear Wheels of Plows; and I hereby declare the following to be a full, clear, and exact description of the same.

My invention relates to improvements in wheeled plows, and particularly to means for supporting and regulating the movement of the rear bearing or caster wheel. Its object is to provide a simple stop and release mechanism for the axle of said wheel, whereby the latter may be held against lateral movement outwardly or may be left free to swing in either direction.

The invention consists of a vertically-adjustable bearing-block for the rear axle, an angular lever-plate pivoted on the frame and having a stop engaging said axle, a foot-lever pivoted intermediate of its ends, and connections between said lever and said lever-plate, whereby the latter is thrown in and out of engagement with the axle, as desired.

Having reference to the accompanying drawings, Figure 1 is a plan view of plow. Fig. 2 is a side view of plow. Fig. 3 is a rear view of plow.

A represents a frame of suitable well-known construction supported upon wheels 2, 3, and 4, which are respectively known as the "land-wheel," the "furrow-wheel," and the "caster-wheel," and having the usual disk-plows 5. The wheels 3 and 4 are disposed at an incline and are adapted to travel in furrows to hold the plows from crowding into the land. The bent axle 6 of the rear or caster wheel has a vertical portion which is journaled in the block 7. The latter is adjustable vertically on the frame A by means of a set-screw 8. A plate 9 rests upon the top of block 7 and is turnable about the vertical portion of the axle. The latter has a horizontal portion, with which a flange 10 on one side of said plate is adapted to engage. The plate has a projecting arm portion 11, which is connected by a link 12 with one end of a foot-lever 13. This lever is fulcrumed intermediate of its ends upon a bracket 14, secured to the frame in suitable relation to the plate and axle.

In operation when the lever 13 is pressed down the bell-crank-lever plate 9 is turned to bring flange 10 into engagement with and to turn the axle, consequently bringing the wheel in toward the land. The two levers being in such position of dead-center the device is locked and the movement of the wheel outward is prevented, as when the plow is in working position. When the foot end of the lever is tripped, the wheel 4 is free to move and to follow idly in the wake of the furrow-wheel 3, as in turning a corner.

Having thus described my invention, what I claim, and desire to secure by Letters Patent, is—

1. The combination with the frame of a wheeled plow, of a swivel connection of the axle of the rear wheel thereof and said frame, a fulcrumed lever-plate having stop means upon one side engaging the axle to limit the lateral movement of the wheel in one direction and means by which said lever-plate is actuated.

2. The combination with the frame of a wheeled plow, of an angular rear-wheel axle swiveled on said frame, a fulcrumed lever having stop means engaging said axle to limit the movement thereof in one direction, and means upon the frame by which said stop may be actuated independent of the movement of the plow or team.

3. The combination with the frame of a wheeled plow, of an angular rear-wheel axle having a vertically-disposed bent portion swiveled on said frame, a movable stop engaging said axle, a lever of the first class fulcrumed on the frame and connections including a bell-crank lever between said first-named lever and stop by which the latter may be actuated.

4. The combination with the frame of a wheeled plow, of an angular rear-wheel axle swiveled on said frame, a bell-crank lever fulcrumed concentrically with the swiveled portion of said axle, stop means of said lever engaging the axle to limit the lateral movement of the wheel and means for actuating said lever.

5. The combination with the frame of a wheeled plow, of a vertically-adjustable block 7 upon the frame, an angular rear-wheel axle swiveled in said block, and stop means by which the lateral movement of said axle about said block is controlled.

6. The combination with the frame and rear wheel of a plow, of a vertically-adjustable block in which the rear axle is swiveled, a bell-crank lever turnable about said axle, stop means on said lever engaging the axle, and means by which said plate may be turned to hold said axle against lateral movement.

7. The combination with the frame of a wheeled plow, of an angular rear-wheel axle swiveled on said frame, a bell-crank lever turnable about said axle as a fulcrum, stop means on one arm of said lever engaging the axle, a foot-lever 13 fulcrumed on the frame, and a link 12 connecting one end of said last-named lever and the other arm of the bell-crank lever.

In witness whereof I have hereunto set my hand.

VINCENT T. GILCHRIST.

Witnesses:
M. HAYNES,
J. HARDY.